United States Patent [19]
Nolan et al.

[11] Patent Number: 6,078,208
[45] Date of Patent: Jun. 20, 2000

[54] PRECISION TEMPERATURE SENSOR INTEGRATED CIRCUIT

[75] Inventors: James B. Nolan; Hartono Darmawaskita, both of Chandler, Ariz.

[73] Assignee: Microchip Technology Incorporated, Chandler, Ariz.

[21] Appl. No.: 09/085,828

[22] Filed: May 28, 1998

[51] Int. Cl.[7] .................................................. H01L 35/00
[52] U.S. Cl. ............................................................ 327/512
[58] Field of Search ................................... 327/512, 513; 331/66, 176

[56] References Cited

U.S. PATENT DOCUMENTS

| | | | |
|---|---|---|---|
| 4,603,306 | 7/1986 | Kleinberg | 331/66 |
| 5,465,063 | 11/1995 | Fukuda et al. | 327/512 |
| 5,801,982 | 9/1998 | Blodgett | 331/66 |
| 5,940,786 | 8/1999 | Steeby | 327/378 |

Primary Examiner—Toan Tran
Attorney, Agent, or Firm—Paul N. Katz; Ronald L. Chichester; Frohwitter

[57] ABSTRACT

A precision temperature sensor produces a clock frequency which varies predictably over wide variations of ambient temperature. The invention has a oscillation generator, two independent current generators, a reference oscillator and a frequency counter. The outputs of the two independent current generators are combined to provide an approximately linear capacitor charging current which is directly proportional to changes in temperature. The capacitor charging current is used to drive the oscillation generator which outputs a clock frequency that is approximately linearly dependent on temperature with determinable slope and intercept. The frequency counter compares the output of the oscillation generator with the independent reference oscillator to compute a digital value for temperature. The precision temperature sensor is implemented on a single, monolithic integrated circuit.

35 Claims, 7 Drawing Sheets

PRECISION TEMPERATURE SENSOR INTEGRATED CIRCUIT

BACKGROUND OF THE INVENTION

1. Field of the Invention

This invention relates generally to integrated circuits which measure ambient temperature. Specifically, the present invention is a precision temperature sensor that produces an approximately linear capacitor charging current, which in turn is used to produce a clock frequency that is predictable with variances in ambient temperature. The invention incorporates a relaxation oscillator, two independent current generators, a reference oscillator and a frequency counter to compute ambient temperature. The invention is implemented on a single, monolithic integrated circuit.

2. Description of the Prior Art

Figure 1:
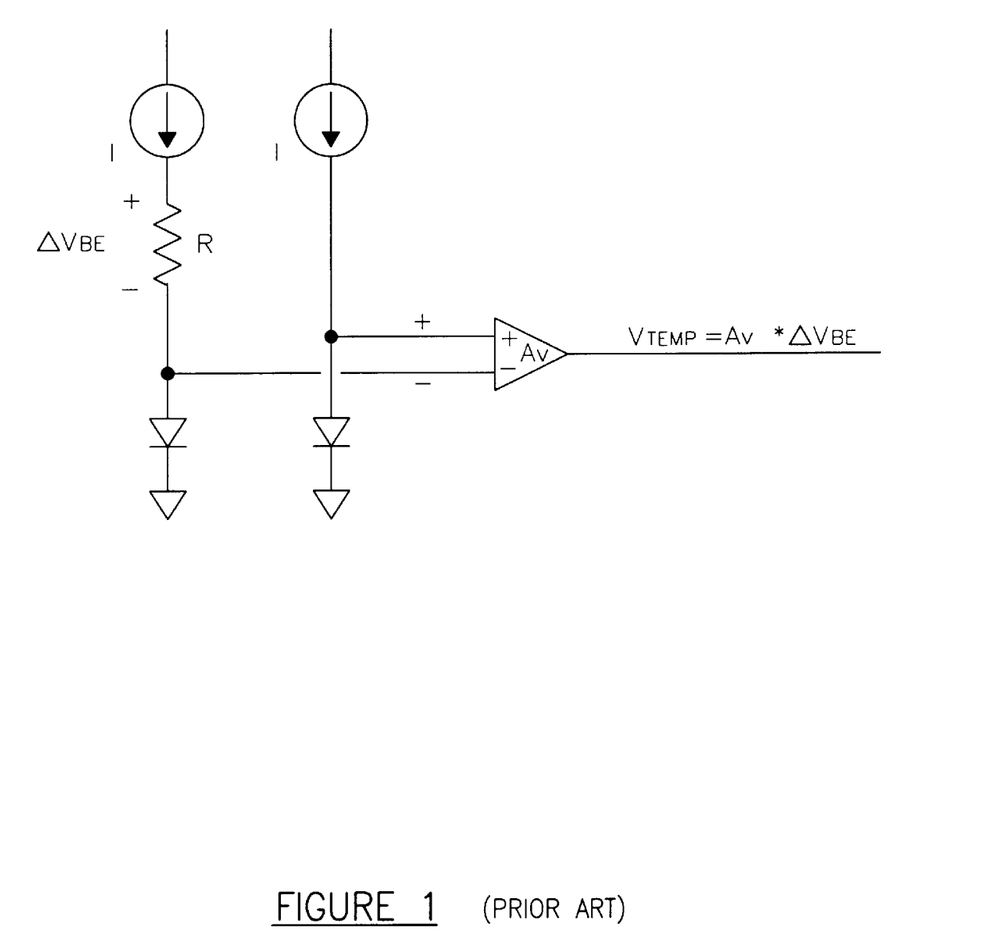
FIG. 1 is a schematic diagram of the prior art showing a temperature sensor circuit.

The prior art is described by FIG. 1 which shows a typical integrated temperature sensor based on the well known $\Delta V_{BE}$ model that generates a voltage proportional to temperature. The prior art integrated circuit temperature sensors require a differential amplifier and an analog to digital (A-to-D) converter to convert a voltage from a diode, thermistor or other source into a digital temperature equivalent. The traditional, voltage oriented A-to-D converter may also require unnecessary hardware and software overhead not needed for temperature sensing applications. Furthermore, the prior art circuit requires a precision reference voltage which can be very costly depending on the requirements for accuracy.

Therefore, a need existed to provide a temperature sensor implemented on an integrated circuit which is capable of accurate measurement of temperature variations and which reduces complexity, board space and/or die area and pin count.

SUMMARY OF THE INVENTION

It is an object of the present invention to provide a temperature sensor that does not rely on a voltage oriented A-to-D converter, but instead incorporates a current to frequency A-to-D circuit.

It is another object of the present invention to provide a temperature sensor which does not require a precise voltage reference.

It is another object of the present invention to provide a temperature sensor with reduced cost to manufacture, die area and pin count.

In accordance with one embodiment of the present invention, a temperature sensor that produces an accurate measurement over wide variations of ambient temperature is disclosed. The precision relaxation oscillator is comprised of an oscillation generator, a first current generator for producing a first output current, a second current generator for producing a second output current, a reference oscillator and a frequency counter. The invention is implemented on a single, monolithic integrated circuit.

In accordance with another embodiment of the present invention the reference oscillator is comprised of a second oscillation generator.

In accordance with another embodiment of the present invention the reference oscillator is comprised of a crystal oscillator.

In accordance with another embodiment of the present invention one or more external resistors may be coupled to either the first or second current generators to produce the respective output currents.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENT

Figure 2:
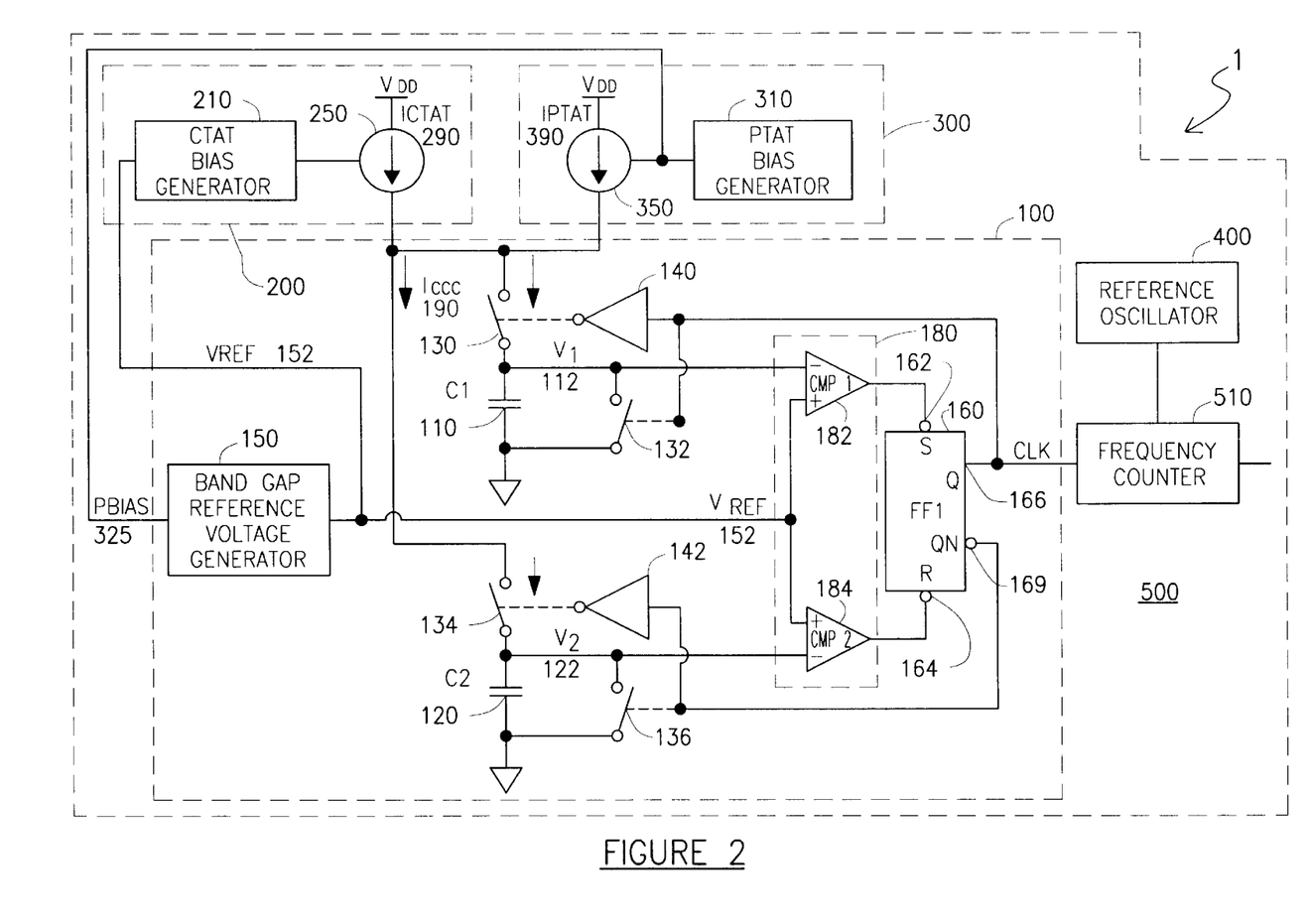
FIG. 2 is a block diagram of the present invention.

Referring to FIG. 2, a precision temperature sensor 1 that produces an accurate measurement over wide variations of ambient temperature is shown.

The precision temperature sensor 1 is comprised of an oscillation generator 100, a first current generator 300 which is typically a Proportional to Absolute Temperature (PTAT) current generator, a second current generator 200 which is typically a Complementary to Absolute Temperature (CTAT) current generator, a reference oscillator 400 and a frequency counter 500. However, those skilled in the art will recognize that the roles for the current generator may be reversed, i.e. the first current generator 200 may be the CTAT and the second current generator 300 may be the PTAT. In the preferred embodiment of the present invention, the precision temperature sensor 1 is implemented on a single, monolithic integrated circuit.

Figure 2A:
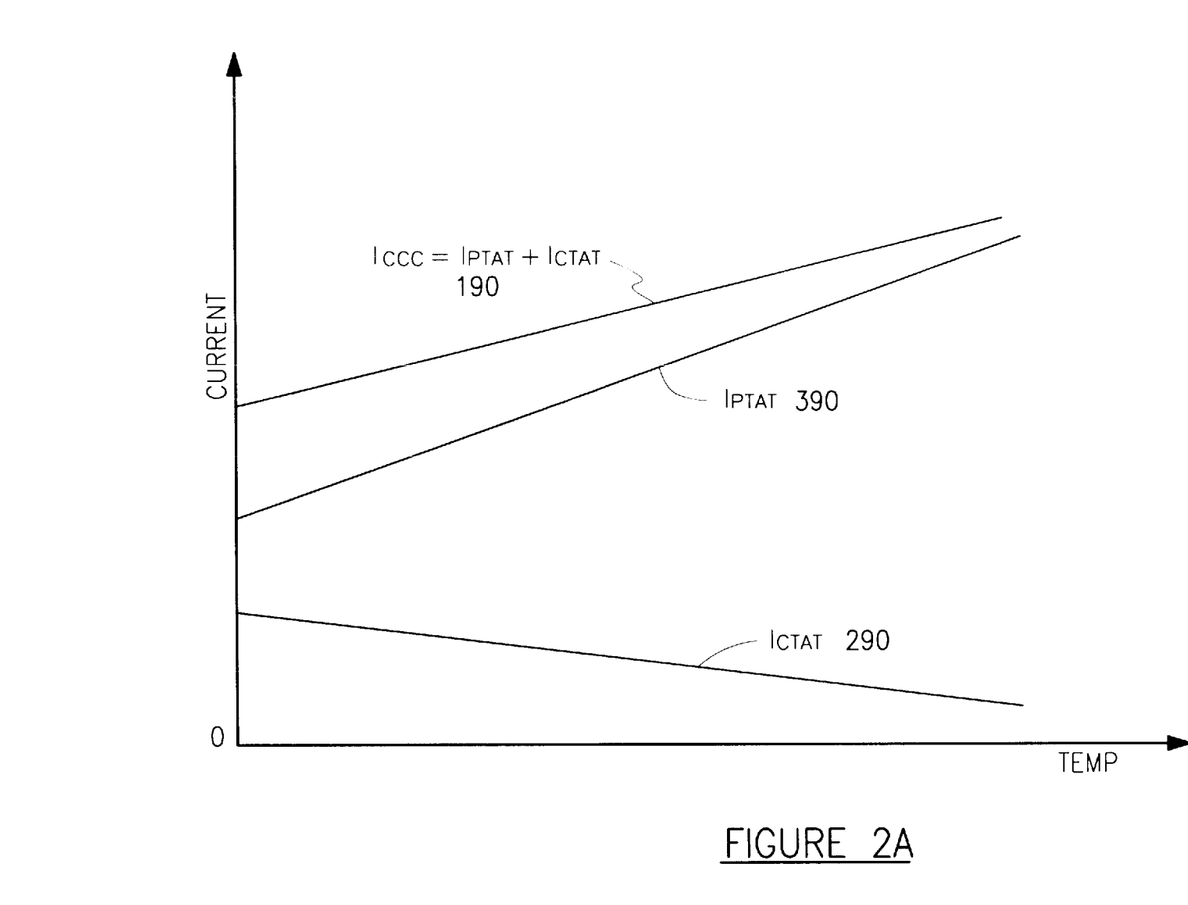
FIG. 2A is a graph depicting the linear characteristics and the relationships between the current parameters of the present invention.

Referring to FIGS. 2 and 2A, the independent CTAT 200 and PTAT 300 current generators provide a CTAT current 290 and a PTAT current 390 which are approximately linear with respect to temperature. In the preferred embodiment, the CTAT current 290 and PTAT current 390 (FIGS. 4 and 5) are combined to form a capacitor charging current ($I_{CCC}$) 190 ($I_{CCC}$ 190=CTAT current 290+PTAT current 390) which has a constant, positive slope with respect to temperature.

In the preferred embodiment the PTAT current 390 is the dominant component of $I_{CCC}$ 190 and has a constant, positive slope directly proportional to temperature, but which may vary slightly from device to device because of fabrication anomalies or process drift. The CTAT current 290 has a slope, which is proportional to temperature and is combined with the PTAT current 390 so that a predictable, uniform $I_{CCC}$ 190, which varies approximately linearly with temperature, is achieved from device to device. In the preferred embodiment CTAT current has a negative slope with respect to temperature. In other embodiments, the PTAT current 390 may be the sole component of $I_{CCC}$ 190 and may be digitally trimmed as described below. In still other embodiments, the CTAT current 290 may be the sole component of $I_{CCC}$ 190 and may also be digitally trimmed. $I_{CCC}$ 190 is subsequently used by the oscillation generator 100 (FIG. 2) to produce a predictable clock frequency that varies with temperature.

In the preferred embodiment as illustrated in FIG. 2, the oscillation generator 100 is comprised of a set-reset flip-flop 160, a comparator circuit 180 further comprised of two comparators 182 and 184, two capacitors 110 and 120, four transistor switches 130, 132, 134 and 136, two inverters 140 and 142 and a bandgap reference voltage circuit 150 for producing a reference voltage 152. Those skilled in the art will recognize that other combinations of these components or similar components are possible to achieve substantially the same results.

The transistor switches 130 and 134 provide charging paths for the capacitors 110 and 120, respectively. The transistor switches 132 and 136 provide discharging paths for the capacitors 110 and 120, respectively. In the preferred embodiment, the transistor switches 130, 132, 134 and 136 are MOSFET transistors, however, those skilled in the art will recognize that the invention is not limited to this technology.

The oscillation generator 100 operates by having one capacitor charge while the other capacitor discharges. The discharge path for the capacitor 110 is connected via transistor switch 132 to an input of the comparator 182. The discharge path for the capacitor 120 is connected via transistor switch 136 to an input of the comparator 184.

In the preferred embodiment, and for best performance, a stable reference voltage source such as a bandgap reference voltage circuit 150 is used. The bandgap reference voltage circuit 150 provides a single reference voltage 152, which is connected to second inputs of comparators 182 and 184, and is used to set the common mode voltage at each comparator 182 and 184. The $P_{BIAS}$ input 325 for the bandgap reference voltage circuit 150 is an output of the PTAT bias generator 310 which is described below. The bandgap reference voltage circuit 150 has the advantage of stabilizing $I_{CCC}$ 190 and minimizing the error due to variance in comparator input slew and propagation delay. Furthermore, in order to cancel the effects of reference voltage drift, the CTAT 200 current generator relies on the same reference voltage 152 as the comparators 182 and 184. There are various embodiments of the bandgap reference voltage circuit 150 which are well known to those skilled in the art. However, the novel way in which the bandgap reference voltage circuit 150 is implemented in the present invention is not disclosed by the prior art.

The output of comparator 182 is connected to the set input 162 of the flip-flop 160. The output of comparator 184 is connected to the reset input 164 of the flip-flop 160. Thus, as the capacitors 110 and 120 alternatively charge and discharge, the outputs of the comparators 182 and 184 alternatively set and reset the flip-flop 160 thus producing a clock output.

The Q output 166 of the flip-flop 160 provides a clock frequency that is directly related to temperature variation. In the preferred embodiment, the Q output 166 is also coupled to transistor switch 132 and via inverter 140 to transistor switch 130. Thus, the Q output 166 provides the signal that controls the transistor switches 130 and 132, which in turn open and close the charging and discharging paths for capacitor 110.

The complementary Q output 168 of flip-flop 160 provides a second clock frequency that is also directly related to temperature and the complement of Q output 166. The complementary Q output 168 is coupled to transistor switch 136 and via inverter 142 to transistor switch 134. Thus, the complementary Q output 168 provides the signal that controls the transistor switches 134 and 136 which in turn open and close the charging and discharging paths for capacitor 120.

The reference oscillator 400, has a temperature coefficient much smaller than that of the current generators 200 and 300, thereby providing a stable clock frequency over wide variations in temperature. The reference oscillator 400 and the Q output 166 of flip-flop 160 are coupled to the frequency counter 500. For moderate precision, the reference oscillator 400 may be a second oscillation generator 100 as described below.

For higher precision, a crystal oscillator is the preferred embodiment because it has high stability over temperature. The frequency counter 500 compares the temperature sensitive Q output 166 with the temperature insensitive reference oscillator 400 and provides an output 510 that is an accurate representation of temperature. Frequency counters of various embodiments are well know to those skilled in the art and therefore need not be described further.

Figure 3:
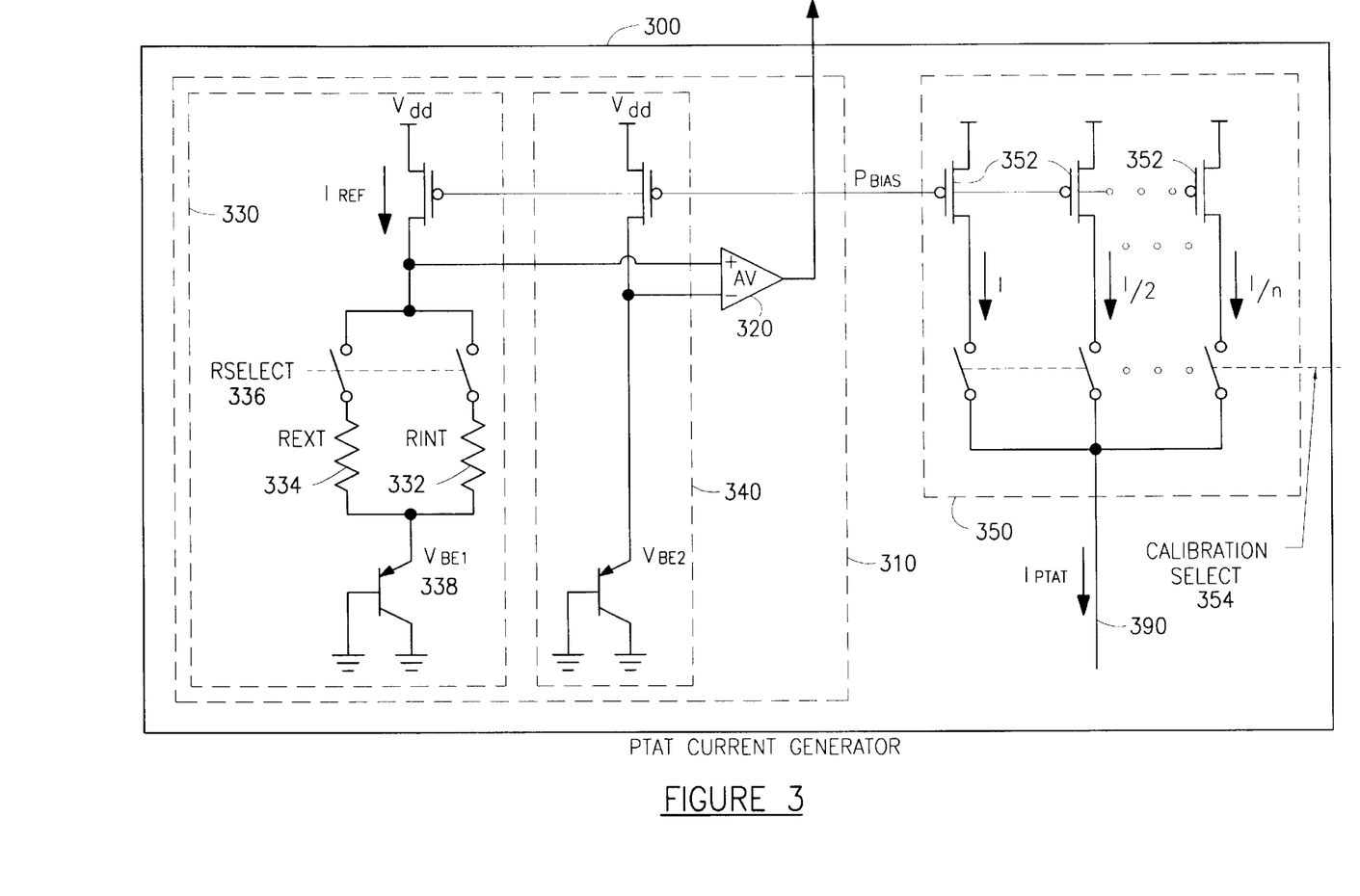
FIG. 3 is a block diagram of the Proportional to Absolute Temperature (PTAT) current generator found in the present invention.

Referring to FIG. 3, wherein like numerals reflect like elements, the PTAT current generator 300, known to those skilled in the art as a $\Delta V_{BE}$ circuit, is comprised of PTAT bias generator 310 and a PTAT current mirror 350 for producing a PTAT current 390.

The PTAT bias generator 310 is comprised of an amplifier circuit 320, a first bias circuit 330 for producing a first bias voltage across a selectable resistor with a small linear temperature coefficient 332 or 334 and a second bias circuit 340 for producing a second bias voltage. The present invention provides that an external resistor 334 may be selected over the internal resistor 332 by a select bit 336.

The first and second bias voltages provide the inputs to the amplifier 320. The output of the amplifier 320 is $P_{BIAS}$ 325 which is coupled to the first 330 and second 340 bias circuits, the PTAT current mirror 350 and the bandgap reference voltage generator 150 (FIG. 1).

The PTAT current mirror 350 is comprised of a plurality of transistors 352 from one to n. As shown in FIG. 3, the control electrodes of the transistors 352 are coupled to $P_{BIAS}$ 325. Trimming for the proper output current is performed digitally by programmable selecting one or more of the current mirror transistors 352 via the calibration select 354 to obtain the desired PTAT current 390. In the preferred embodiment, the calibration select switches 354 are PMOS transistors. However, those skilled in the art will recognize that other types of switches are possible which result in substantially the same result.

In the preferred embodiment, the current mirror 350 acts as a current divider which is well known to those skilled in the art. In other embodiments the current mirror 350 may be configured as a current multiplier. The PTAT current 390 is the sum of the selected outputs from the current mirror transistors 352. Thus, the PTAT current generator 300 permits determination of the slope and intercept of the approximately linear PTAT current 390 with respect to temperature as shown in FIG. 2A.

Figure 4:
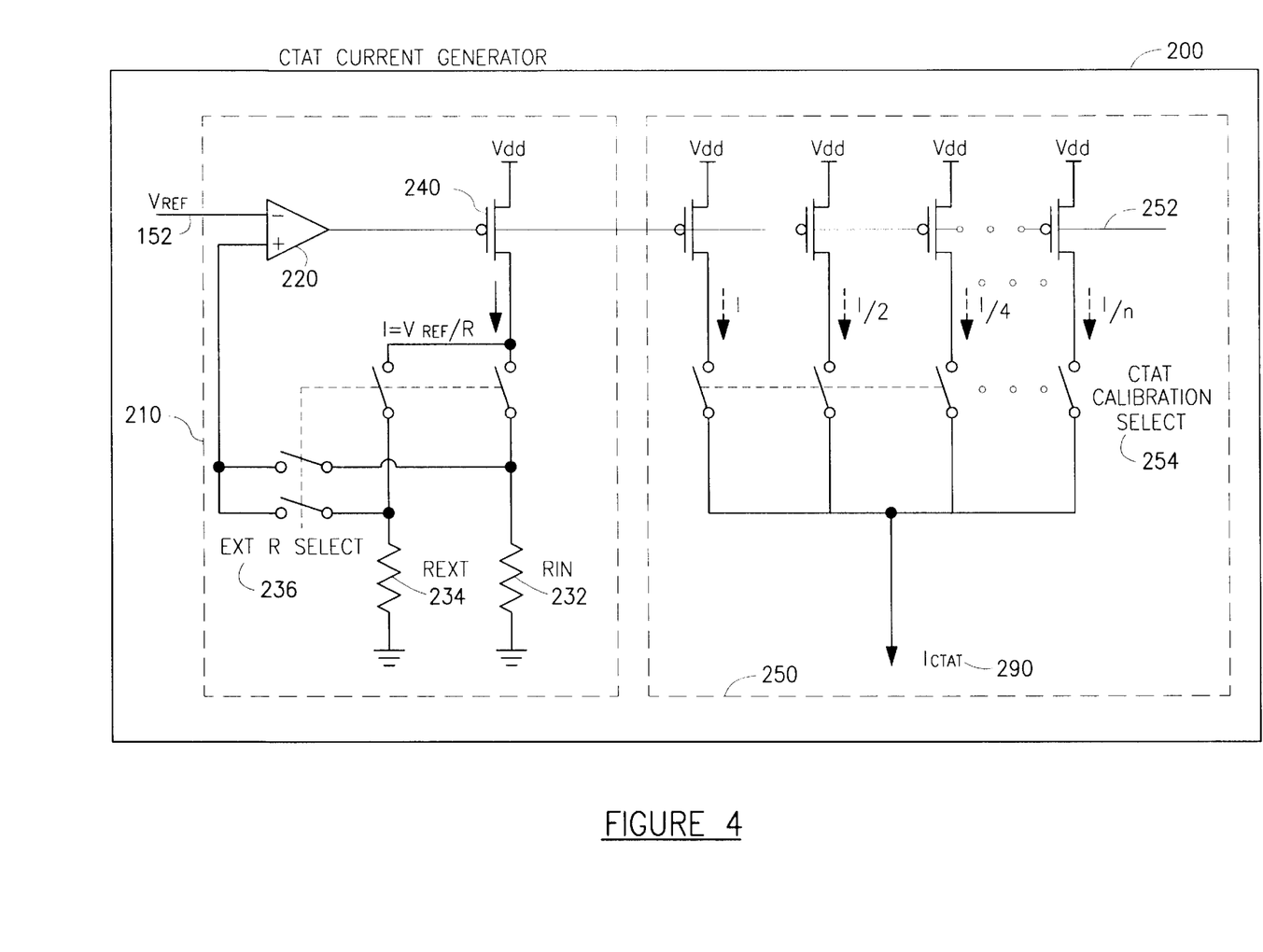
FIG. 4 is a block diagram of the Complementary to Absolute Temperature (CTAT) current generator found in the present invention.

Referring to FIG. 4, wherein like numerals reflect like elements, the CTAT current generator 200 is comprised of a CTAT bias generator 210 and a current mirror 250 for producing the CTAT current 290.

The CTAT bias generator 210 is comprised of an amplifier circuit 220, at least one resistor with a small positive temperature coefficient 232 and 234 for regulating the input current to the amplifier and a transistor 240 for providing an input current to the amplifier 220. The amplifier 220 is a cascode configuration for supply and noise rejection. The reference voltage 152 is coupled to an input of the amplifier 220. The present invention provides that an external resistor 234 may be selected over the internal resistor 232 by a select bit 236.

The current mirror 250 is comprised of a plurality of transistors 252 from one to n. As shown in FIG. 4, the control electrodes of the transistors 252 are coupled to the output of the CTAT bias generator amplifier 220. Trimming the CTAT current 290 for achieving the proper PTAT:CTAT balance is performed digitally by programmable selecting one or more of the current mirror transistors 252 via the calibration select 254 to obtain the desired CTAT current 290. In the preferred embodiment, the calibration select switches 254 are PMOS transistors. However, those skilled in the art will recognize that other types of switches are possible which result in substantially the same result.

Thus, trimming is the process of controlling the output currents 290 and 390 of the current mirrors 250 and 350, respectively, with respect to temperature. When the trimmed output currents 290 and 390 are combined at the oscillation generator 100 (FIG. 2), the proper slope and intercept (current versus temperature) for $I_{CCC}$ 190 is achieved for the purpose of producing a clock frequency 166 (FIG. 2) that predictably varies with temperature. The approximately linear $I_{CCC}$ 190 produces an approximately linear clock frequency 166 with respect to temperature. Therefore, it follows that the trimmed output currents 290 and 390 are combined as $I_{CCC}$ 190 to control the proper slope and intercept of clock frequency 166 over temperature as illustrated in FIG. 2A.

In the preferred embodiment, the current mirror 250 acts as a current divider which is well known to those skilled in the art. In other embodiments the current mirror 250 may be configured as a current multiplier. The CTAT current 290 is the sum of the selected outputs from the current mirror transistors 252.

Figure 5:
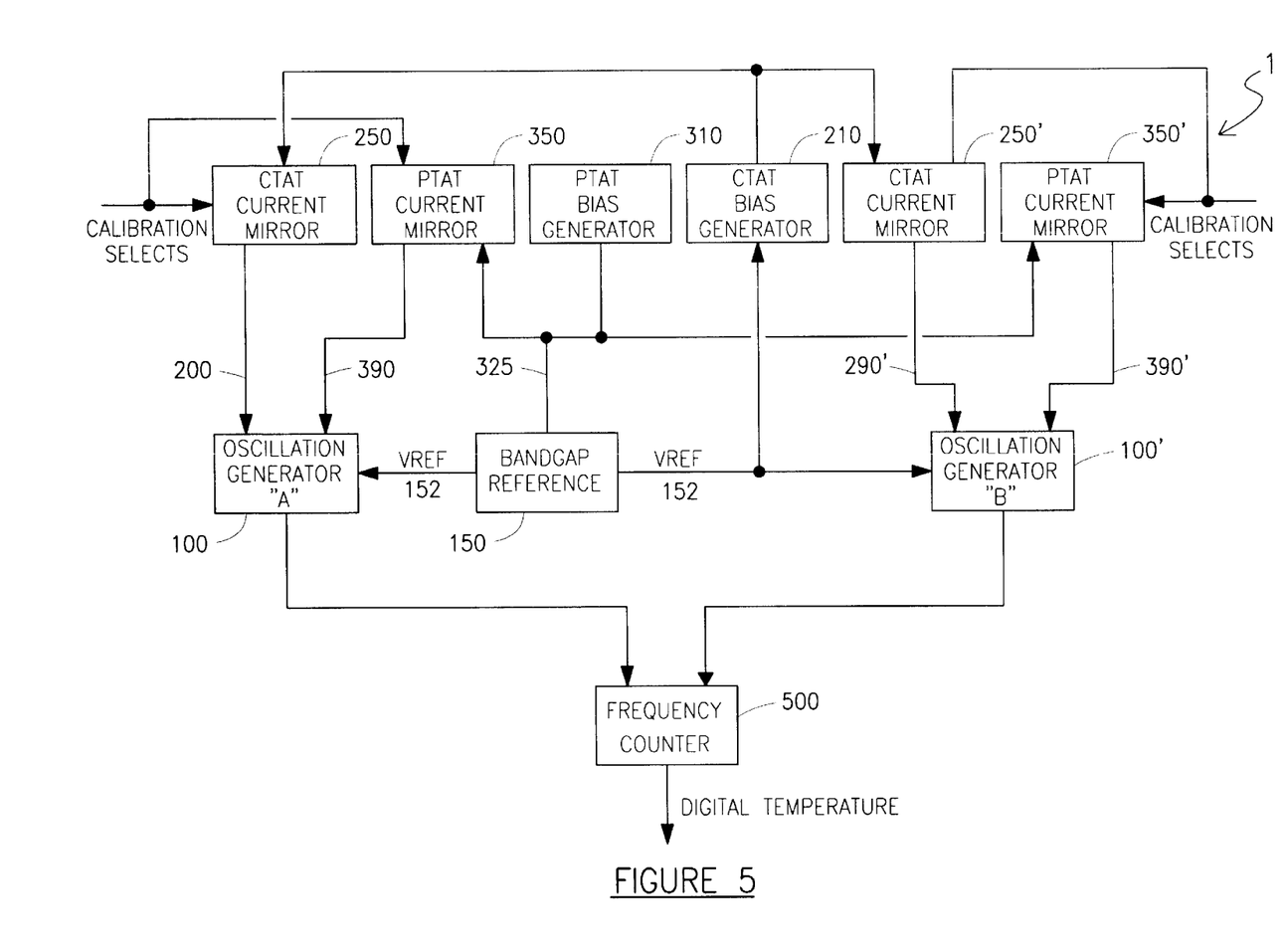
FIG. 5 is a block diagram of the moderate precision temperature sensor embodiment of the present invention.

Referring to FIG. 5, wherein like numerals reflect like elements and numbers with primes (') represent additional circuitry of like characteristics, the moderate precision temperature sensor embodiment is shown. In this embodiment a common PTAT bias generator 310 and CTAT bias generator 210 each drive a unique pair of PTAT current mirrors 350 and 350' and CTAT current mirrors 250 and 250', respectively. The PTAT bias generator 310 also drives the reference voltage generator 150, as previously described. The PTAT/CTAT current mirrors 350 and 250 produce temperature sensitive output currents 390 and 290. These PTAT/CTAT currents 390 and 290 drive the oscillation generator 100 to produce a clock frequency that varies proportionally with temperatures as described above.

The PTAT/CTAT current mirrors 350' and 250' are very similar to the PTAT/CTAT current mirrors 350 and 250, except that PTAT/CTAT current mirrors 350' and 250' produce temperature insensitive output currents 390' and 290' by controlling the ratio of PTAT/CTAT current 390' and 290' so that the slope of the combined current is insensitive with respect to temperature. These PTAT/CTAT currents 390' and 290' drive the oscillation generator 100', which is structurally similar to oscillation generator 100. The output of oscillation generator 100' is a clock frequency which does not vary, or varies very little, with respect to temperature. The frequency counter 500 compares the two clock frequencies from the oscillation generators 100 and 100' to produce a digital temperature measurement, as described above.

Figure 6:
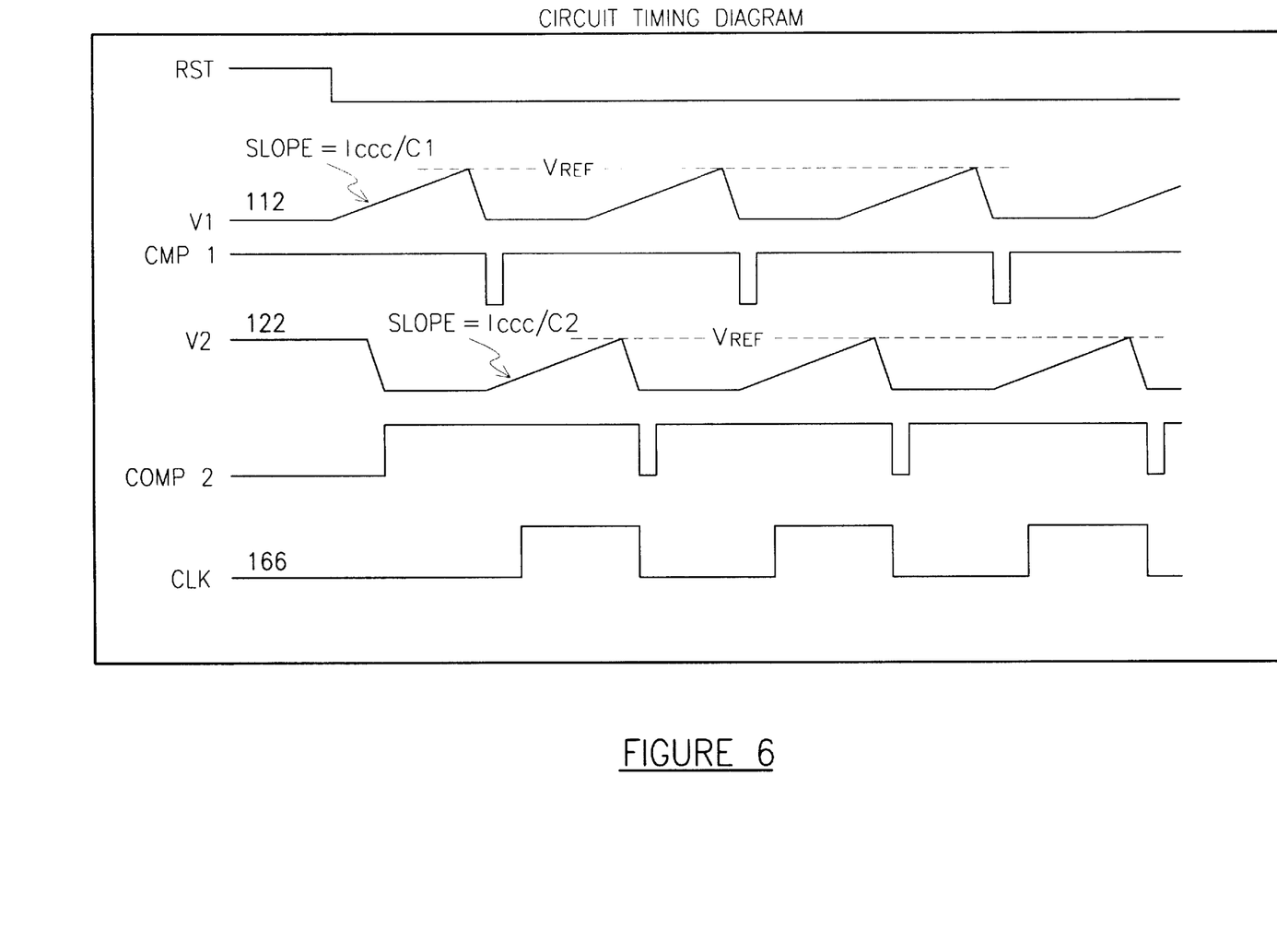
FIG. 6 is a timing diagram of specific parameters of the present invention.

Referring to FIG. 6, wherein like numerals reflect like elements, a timing diagram for the temperature sensor 1 is shown. V1 112 reflects the charging and discharging of capacitor 110 (FIG. 1). Note that the positive slope (charging) of V1 112 is equal to $I_{CCC}$ 190 divided by the capacitance of capacitor 110. The maximum amplitude of V1 112 is equal to the reference voltage 152. CMP1 reflects the output of the comparator 182 which is coupled to the set input 162 of the flip-flop 160.

V2 122 reflects the charging and discharging of capacitor 120. In this case the positive slope of V2 122 is equal to $I_{CCC}$ 190 divided by the capacitance of capacitor 120. CMP2 reflects the output of the comparator 184 which is coupled to the reset input 164 of the flip-flop 160. CLK is the Q output 166 of the flip-flop 160.

For a 50 percent duty cycle, the values of capacitors 110 and 120 are identical which result in similar slopes for V1 112 and V2 122. As the capacitor voltage exceeds the reference voltage 152, the respective comparator 182 and 184 pulses low which causes the flip-flop 160 to change state. RST (reset) is used to initialize the comparators 182 and 184 and the flip-flop 160 to a known state and to operate the sensor in a one shot mode.

The present invention produces a clock frequency which is directly proportional to temperature. This is accomplished by providing bias currents which when trimmed and summed yield a predictable capacitor charging current that is approximately linearly proportional to temperature. The circuit 1 performs digital trimming of the bias currents 290 and 390 via the programmable current mirrors 250 and 350 to eliminate process variations, using a stable voltage reference such as a bandgap reference voltage circuit 150. The circuit 1 produces a temperature sensitive clock 166 via a dual capacitor, dual comparator oscillation generator 100. The frequency counter 500 compares the output of the oscillation generator 100 to the output of a reference oscillator to compute a digital temperature 510. Also, analog design techniques, well known to those skilled in the art, such as component matching and cascode current sources enhance the stability of the circuit.

Although the invention has been particularly shown and described with reference to a preferred embodiment thereof, it will be understood by those skilled in the art that changes in form and detail may be made therein without departing from the spirit and scope of the invention.

What is claimed is:

1. A precision temperature sensor circuit comprising:

an oscillation generator;

a first current generator coupled to the oscillation generator;

a second current generator coupled to the oscillation generator;

wherein an output current from the first current generator is combined with an output current from the second current generator for achieving a combined current which is linearly proportional to temperature; and wherein the circuit is implemented on a single, monolithic integrated circuit.

2. The circuit in accordance with claim 1 further comprising:

a frequency counter coupled to the oscillation generator; and a reference oscillator coupled to the frequency counter.

3. The circuit in accordance with claim 1 wherein the oscillation generator comprises:
   a flip-flop;
   a comparator circuit coupled to the flip-flop;
   a reference voltage circuit coupled to the comparator circuit;
   at least one capacitor coupled to the comparator circuit;
   at least one switch circuit coupled to the at least one capacitor; and
   at least one inverter coupled to the flip-flop.

4. The circuit in accordance with claim 3 wherein the reference voltage circuit is a bandgap reference voltage circuit.

5. The circuit in accordance with claim 3 wherein the comparator circuit is comprised of two comparators.

6. The circuit in accordance with claim 5 wherein one input of each of the two comparators and the first current generator are all coupled to the reference voltage circuit.

7. The circuit in accordance with claim 5 wherein a first of the two comparators is for setting the flip-flop.

8. The circuit in accordance with claim 5 wherein a second of the two comparators is for resetting the flip-flop.

9. The circuit in accordance with claim 3 wherein the at least one switch coupled to the at least one capacitor comprises:
   a first plurality of switches coupled to a first capacitor; and
   a second plurality of switches coupled to a second capacitor.

10. The circuit in accordance with claim 9 wherein the first and second plurality of switches are MOSFET transistors.

11. The circuit in accordance with claim 9 wherein the flip-flop comprises:
    a first output for providing a first clock frequency directly proportional to temperature variation and for controlling the first plurality of switches; and
    a second output for providing a second clock frequency directly proportional to temperature variation which is the complement of the first stable clock frequency and for controlling the second plurality of switches.

12. The circuit in accordance with claim 9 wherein the first plurality of switches provides a charging path and a discharging path for the first capacitor.

13. The circuit in accordance with claim 9 wherein the second plurality of switches provides a charging path and a discharging path for the second capacitor.

14. The circuit in accordance with claim 12 wherein the discharging path for the first capacitor is connected to an input of a first comparator by one of the first plurality of switches.

15. The circuit in accordance with claim 13 wherein the discharging path of the second capacitor is connected to an input of a second comparator by one of the second plurality of switches.

16. The circuit in accordance with claim 1 wherein the combined current is used by the oscillation generator to produce a clock frequency which varies proportionally to temperature.

17. The circuit in accordance with claim 1 wherein the output current from the second current generator is combined with the output current from the first current generator for adjusting the slope and intercept of the combined current with respect to temperature.

18. The circuit in accordance with claim 1 wherein the first current generator comprises:
    a first bias generator;
    a first current mirror coupled to the first bias generator for producing a first output current that varies proportionally with temperature.

19. The circuit in accordance with claim 18 wherein the first bias generator comprises:
    a first amplifier circuit;
    at least one transistor coupled to the first amplifier circuit; and
    at least one resistor having a small positive temperature coefficient coupled to an input of the first amplifier circuit.

20. The circuit in accordance with claim 18 wherein the current mirror is comprised of a plurality of transistors which are individually selectable to produce the first output current.

21. The circuit in accordance with claim 18 wherein one of the at least one resistor is external to the single, monolithic integrated circuit.

22. The circuit in accordance with claim 1 wherein the second current generator comprises:
    a second bias generator;
    a second current mirror coupled to the second bias generator for producing a second output current that varies proportionally with temperature.

23. The circuit in accordance with claim 22 wherein the second bias generator comprises:
    a second amplifier circuit;
    a first bias circuit for producing a first bias voltage wherein the first bias voltage is coupled to a first input of the second amplifier circuit; and
    a second bias circuit for producing a second bias voltage wherein the second bias voltage is coupled to a second input of the second amplifier circuit.

24. The circuit in accordance with claim 23 wherein the first bias circuit for producing the first bias voltage is comprised of at least one resistor having a small positive temperature coefficient.

25. The circuit in accordance with claim 24 wherein one of the at least one resistor is external to the single, monolithic integrated circuit.

26. The circuit in accordance with claim 23 wherein an output of the second amplifier circuit is coupled to the oscillation generator for producing a reference voltage.

27. The circuit in accordance with claim 22 wherein the second current mirror is comprised of a plurality of transistors which are individually selectable to produce the second output current.

28. A precision temperature circuit comprising:
    an oscillation generator;
    a first current generator coupled to the oscillation generator for producing a first output current that varies proportionally with temperature;
    a second current generator coupled to the oscillation generator for producing a second output current that varies proportionally with temperature and is of opposite slope with respect to temperature from the first output current; and
    wherein the circuit is implemented on a single, integrated circuit.

29. The circuit in accordance with claim 28 wherein the first output current is combined with the second output current for achieving a combined current which varies proportionally to temperature.

30. The circuit in accordance with claim 29 wherein the output current from the second current generator is combined with the output current from the first current generator for adjusting slope and intercept of the combined current with respect to temperature.

31. The circuit in accordance with claim 29 wherein the output current from the second current generator is combined with the output current from the first current generator for adjusting slope and intercept of the clock frequency with respect to temperature.

32. The circuit in accordance with claim 28 wherein the first and second current generators may be programmed to compensate for process and supply voltage variations.

33. A precision temperature sensor circuit comprising:

a plurality of oscillation generators;

at least one bias generator and at least one current mirror; and wherein the at least one current mirror is coupled to the at least one bias generator for producing an output current that varies proportionally with temperature.

34. The circuit in accordance with claim 33 further comprising a reference voltage circuit coupled to the plurality of oscillation generations.

35. The circuit in accordance with claim 33 further comprising a frequency counter coupled to the plurality of oscillation generators.

* * * * *